United States Patent Office 3,397,913
Patented Aug. 20, 1968

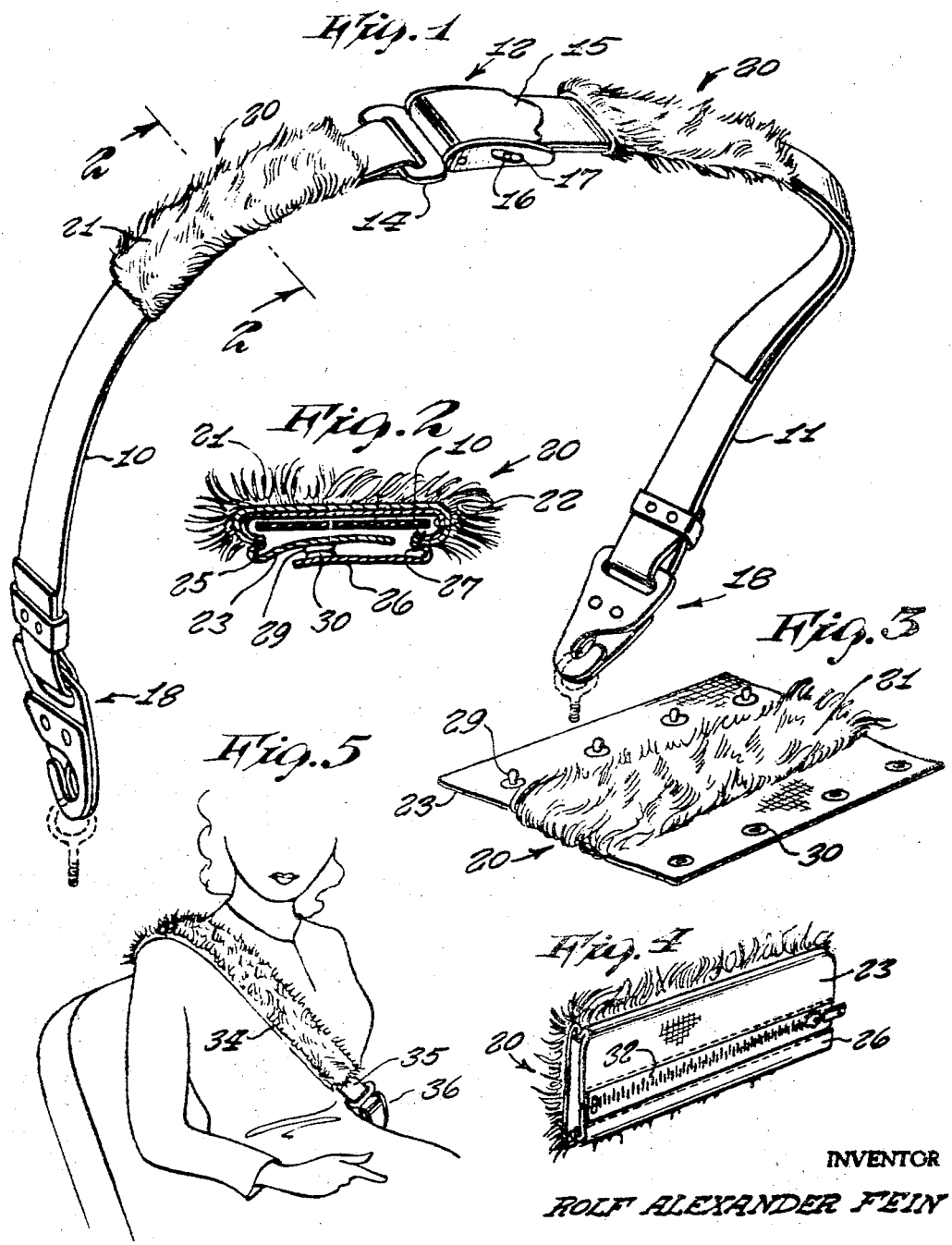

3,397,913
DETACHABLE DECORATIVE SEAT
BELT COVER
Rolf Alexander Fein, Stonehaven Estate, Rte. 312,
Brewster, N.Y. 10509
Continuation of application Ser. No. 450,892, Apr. 26,
1965. This application Jan. 25, 1967, Ser. No. 611,774
7 Claims. (Cl. 297—385)

This application is a continuation of my application Ser. No. 450,892, filed Apr. 26, 1965, now abandoned.

The present invention relates to safety seat belts of the type used in automobiles and more particularly to detachable decorative covers which may be applied to the seat belts or removed therefrom at will.

The detachable covers may be applied adjacent to the buckle of a seat belt without detaching the permanently anchored ends and with a snug fit which prevents the covers from sliding over the buckle elements.

Each cover comprises a decorative strip which is formed of fur, imitation fur, deep pile woven fabric, or a jeweled fabric. The width of the decorative strip is slightly greater than that of the seat belt to which it is applied. The decorative strip faces outwardly. Attached to the lateral edges of the decorative strip are two narrower retaining strips the free edge portions of which are secured together by detachable fastening means such as buttons, snap fasteners, slide fasteners or the like. The retaining strips face inwardly.

The invention will be described in greater detail in the following specification with reference to the accompanying drawing forming a part hereof.

In the drawing:

FIGURE 1 is a perspective view of a safety seat belt with a decorative cover in accordance with the invention applied at either side of the buckle.

FIGURE 2 is a transverse sectional view taken along the line 2—2 of FIG. 1 looking in the direction of the arrows.

FIGURE 3 is a perspective view of one of the covers laid flat to illustrate the decorative strip and the two retaining strips.

FIGURE 4 is a perspective view of a modified form of cover wherein a slide fastener is employed instead of snap fasteners as shown in FIGS. 2 and 3.

FIGURE 5 is a perspective view showing a harness type of seat belt wherein the single cover is longer than either of the two covers shown in FIG. 1 and extends diagonally across the chest of the user above the buckle.

Referring to FIG. 1, a safety seat belt is shown which comprises portions 10 and 11 detachably interconnected by a buckle designated generally as 12. Belt portion 10 is connected to a buckle element 14. Buckle element 14 may be released by outward pivotal movement of a spring biased releasing lever 15. Belt portion 11 passes around a length adjustment roller 16 mounted in obliquely inclined slots 17 formed in the lateral walls of the buckle 12. By urging the roller 16 leftwardly as viewed in FIG. 1, the belt portion 11 may be released from the gripping action of roller 16 and adjusted so that effective length of the belt portions 10, 11 is varied. When the roller 16 is released it locks the belt portion 11 in the buckle 12 by wedging action of the roller 16 in slots 17.

The outer ends of the seat belt portions 10 and 11 are permanently anchored by couplings designated generally as 18 secured to eyebolts 19. The eyebolts 19 are shown in dotted outline and are fixedly secured to the body of the automobile in conventional manner.

The belt of FIG. 1 is shown provided with two decorative covers each designated generally as 20. The cover 20 comprises an elongated central decorative strip 21 formed of fur such as chinchilla, mink, ocelot, tiger, leopard, kid or the like. A layer of woven fabric 22 is shown applied to the inner face of the decorative strip 21 to prevent stretching. When the hide portion of the fur strip 21 is thick and strong, the fabric 22 may be omitted. Imitation fur may be employed, or other decorative fabrics such as jewel encrusted materials may be used, if desired.

A retaining strip 23 is secured to one edge of the decorative strip 21 and fabric layer 22 by a row of stitching 25. Another retaining strip 26 is secured to the other lateral edge of the decorative strip 21 and fabric layer 22 by another row of stitching 27. The retaining strips 23 and 26 are formed of strong woven fabric the outer surface of which preferably has a smooth finish to avoid friction when in contact with the garments of the user. The inner surface, if desired, may be finished to prevent slippage of the cover along the seat belt.

The retaining strip 23 is provided with a series of male snap fastener portions 29. The retaining strip 26 is provided with a series of female snap fastener portions 30 which cooperate with the male portions 29 as shown in FIG. 2 to hold the cover 20 around the seat belt portion 10.

The covers 20 may be removed and replaced at will by means of the snap fasteners 29, 30 without disturbing the couplings 18 which hold the outer ends of seat belt portions 10 and 11 permanently anchored. The decorative covers 20 enhance the appearance of the seat belt and also serve to attract attention to the presence of the seat belt, inviting its use.

In FIG. 4, the snap fasteners 29, 30 have been replaced by a slide fastener 32 which detachably interconnects the outer edge portions of the retaining strips 23 and 26.

FIG. 5 shows a decorative cover 34 applied to a harness type safety seat belt 35 above the buckle 36. The cover 34 is similar to the cover 20 described above except that it is longer so that it may extend diagonally across the chest of the user, as shown.

While I have shown and described what I believe to be the best embodiments of my invention, it will be apparent to those skilled in the art that various changes and modifications may be made therein without departing from the spirit and scope of the invention as defined in the appended claims.

What is claimed is:

1. A detachable seat belt cover comprising: a central elongated decorative strip portion; a first retaining strip portion connected to one lateral edge portion of said decorative strip portion; a second retaining strip portion connected to the other lateral edge portion; and detachable fastening means carried by said retaining strip portions for holding said retaining strip portions connected together for laterally surrounding a seat belt to which said cover is applied.

2. A detachable seat belt cover comprising: an elongated decorative strip portion the width of which is at least as great as the width of the seat belt to which said cover is to be applied; a first retaining strip portion connected to one lateral edge portion of said decorative strip portion; a second retaining strip portion connected to the other lateral edge portion; and detachable fastening means carried by said retaining strip portions for holding said retaining strip portions connected together for laterally surrounding a seat belt to which said cover is applied.

3. A cover according to claim 2, wherein said decorative strip portion is formed of fur, the hairs of said fur facing outwardly when said cover is applied to a seat belt.

4. A cover according to claim 3, further comprising a layer of fabric applied to the inner face of said fur for preventing the stretching thereof, said fabric being connected to said retaining strip portions along with said fur by rows of stitching.

5. A seat belt having permanently anchored end portions; a releasable buckle serially included in said seat belt intermediate said anchored end portions; and a cover laterally surrounding said seat belt intermediate said buckle and one of said end portions, said cover comprising an elongated decorative strip portion the width of which is at least as great as the width of the seat belt to which said cover is to be applied; a first retaining strip portion connected to one lateral edge portion of said decorative strip portion; a second retaining strip portion connected to the other lateral edge portion; and detachable fastening means carried by said retaining strip portions for holding said retaining strip portions connected together for laterally surrounding a seat belt to which said cover is applied.

6. A seat belt according to claim 5, wherein said decorative strip portion is formed of fur, the hairs of said fur facing outwardly when said cover is applied to a seat belt.

7. A seat belt according to claim 6, further comprising a layer of fabric applied to the inner face of said fur for preventing the stretching thereof, said fabric being connected to said retaining strip portions along with said fur by rows of stitching.

References Cited

UNITED STATES PATENTS

| | | | |
|---|---|---|---|
| 2,637,849 | 5/1953 | Nelson | 2—2 |
| 2,653,368 | 9/1953 | Elsner | 297—385 |
| 2,765,469 | 8/1956 | King | 2—2 |
| 2,823,383 | 2/1958 | Crawford | 2—2 |
| 2,960,137 | 11/1960 | Lipsitz | 150—12 X |
| 2,998,008 | 8/1961 | Klesa | 297—385 |
| 3,191,599 | 6/1965 | Kendall | 297—389 |

FOREIGN PATENTS

| | | |
|---|---|---|
| 8,886 | 1907 | Great Britain. |
| 1,368,324 | 6/1964 | France. |

JAMES T. McCALL, *Primary Examiner.*